(12) United States Patent
Tung et al.

(10) Patent No.: US 10,365,408 B2
(45) Date of Patent: Jul. 30, 2019

(54) ANTI-GLARE AND ANTI-REFLECTION DEVICE

(71) Applicant: Au Optronics Corporation, Hsinchu (TW)

(72) Inventors: Kuan-Yu Tung, Hsinchu (TW); Shu-Wen Liao, Taoyuan (TW); Wang-Shuo Kao, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 42 days.

(21) Appl. No.: 15/871,028

(22) Filed: Jan. 14, 2018

(65) Prior Publication Data

US 2019/0004213 A1    Jan. 3, 2019

(30) Foreign Application Priority Data

Jun. 30, 2017  (TW) .............................. 106121869 A
Sep. 14, 2017  (TW) .............................. 106131564 A

(51) Int. Cl.
*G02B 1/11* (2015.01)

(52) U.S. Cl.
CPC ...................................... *G02B 1/11* (2013.01)

(58) Field of Classification Search
CPC ... G02B 1/04; G02B 1/11; G02B 1/14; G02B 1/18; G02B 1/105; G02B 1/111; G02B 1/113; G02B 1/115; G02F 1/133502; G02F 1/133504

See application file for complete search history.

(56) References Cited

U.S. PATENT DOCUMENTS

| 8,304,055 B2 | 11/2012 | Haga et al. |
| 8,730,441 B2 | 5/2014 | Yoshihara |
| 9,703,012 B2 | 7/2017 | Sahara et al. |
| 9,841,536 B2 | 12/2017 | Sahara et al. |
| 2008/0286527 A1 | 11/2008 | Haga et al. |

(Continued)

FOREIGN PATENT DOCUMENTS

| CN | 102165334 | 8/2011 |
| CN | 102656486 | 9/2012 |

(Continued)

OTHER PUBLICATIONS

"Office Action of China Counterpart Application", dated Jan. 31, 2019, p. 1-p. 6.

*Primary Examiner* — Sultan Chowdhury
(74) *Attorney, Agent, or Firm* — JCIPRNET

(57) ABSTRACT

An anti-glare and anti-reflection device including a base and an anti-reflection film is provided. The base includes a plurality of micro protrusions. The micro protrusions are connected to each other to form a rough surface. The rough surface has a first point furthest from a display surface and a second point closest to the display surface. A distance between the first point and the second point in a normal direction of the display surface is HD, and 1 µm≤HD≤20 µm. A normal projection of each of the micro protrusions on the display surface has a first axis length R1 and a second axis length R2, 1 µm≤R1≤20 µm, and 1 µm≤R2≤20 µm. The anti-reflection film is disposed on the rough surface. The anti-reflection film has a thickness T in a normal direction of the rough surface, and T/H≤0.1.

17 Claims, 5 Drawing Sheets

(56) References Cited

U.S. PATENT DOCUMENTS

| | | | |
|---|---|---|---|
| 2009/0128917 A1* | 5/2009 | Yoshinari | G02B 5/0226 |
| | | | 359/601 |
| 2011/0116024 A1 | 5/2011 | Tsuchimoto et al. | |
| 2012/0249942 A1 | 10/2012 | Yoshihara | |
| 2013/0038939 A1 | 2/2013 | Walker, Jr. et al. | |
| 2014/0254021 A1* | 9/2014 | Furui | B32B 7/02 |
| | | | 359/609 |
| 2015/0226882 A1 | 8/2015 | Sahara et al. | |
| 2017/0023705 A1 | 1/2017 | Sahara et al. | |

FOREIGN PATENT DOCUMENTS

| | | |
|---|---|---|
| CN | 102884453 | 1/2013 |
| CN | 204101761 | 1/2015 |
| CN | 206124596 | 4/2017 |
| CN | 106873054 | 6/2017 |
| TW | 200951499 | 12/2009 |
| TW | 201411178 | 3/2014 |

* cited by examiner

ANTI-GLARE AND ANTI-REFLECTION DEVICE

CROSS-REFERENCE TO RELATED APPLICATION

This application claims the priority benefits of Taiwan application serial no. 106121869, filed on Jun. 30, 2017, and Taiwan application serial no. 106131564, filed on Sep. 14, 2017. The entirety of each of the above-mentioned patent applications is hereby incorporated by reference herein and made a part of specification.

BACKGROUND OF THE INVENTION

1. Field of the Invention

The invention relates to an optical device. More particularly, the invention relates to an anti-glare and anti-reflection device.

2. Description of Related Art

Display panels are widely adopted in daily life owing to advantages such as compact sizes, low radiation, and power saving. Along with increasing popularity of the display panels and information explosion, people rely more and more on the display panels, rather than conventional paper, to read information. Nevertheless, a display panel reflects ambient light easily compared to the conventional paper, and the reflected ambient light may cause discomfort to a user, and consequently, the user may not be able to read for a long period of time.

In an existing display panel, an anti-glare film is thus disposed most of the time on the display surface, with a purpose to ease the discomfort to the user caused by the reflection of the ambient light. Nevertheless, an anti-glare film of high haze is generally not disposed on the display surface of the display panel in order to prevent problems such as blurring, white mist, and sparkles from happening. Even though an anti-reflection film is disposed on the anti-glare film with haze in order to improve the white mist and other problems, anti-glare effect of the anti-glare films is lowered, or expected anti-reflection effect of the anti-reflection film is unable to be provided and/or phenomenons such as color shift occur.

SUMMARY OF THE INVENTION

The invention provides an anti-glare and anti-reflection device which provides favorable anti-glare and anti-reflection effects.

An anti-glare and anti-reflection device provided by an embodiment of the invention includes a base and an anti-reflection film. The base includes a plurality of micro protrusions. The micro protrusions are connected to each other to form a rough surface. The rough surface has a first point furthest from a display surface and a second point closest to the display surface. A distance between the first point and the second point in a normal direction of the display surface is HD, and 1 μm≤HD≤20 μm. A normal projection of each of the micro protrusions on the display surface has a first axis length R1 and a second axis length R2, 1 μm≤R1≤20 μm, and 1 μm≤R2≤20 μm. The anti-reflection film is disposed on the rough surface. The anti-reflection film has a thickness T in a normal direction of the rough surface, and T/HD≤0.1.

To sum up, in an embodiment of the invention, the thickness of the anti-reflection film is considerably less than a recess depth of the rough surface, and that the anti-reflection film is able to be conformally disposed on the rough surface. As such, the anti-reflection film disposed on the rough surface of the base is less likely to affect diffusion effect of the micro protrusions of the rough surface, and that the anti-glare and anti-reflection device is equipped with favorable anti-glare as well as anti-reflection effects.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
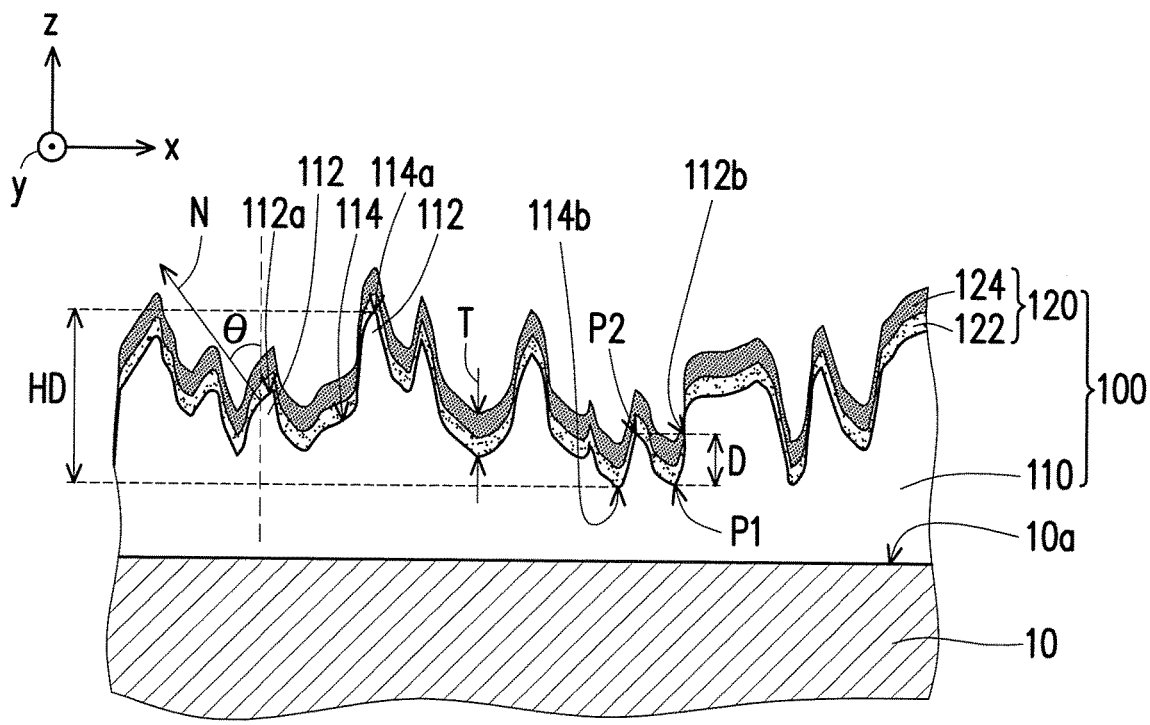
FIG. 1 is a schematic cross-sectional view of an anti-glare and anti-reflection device according to an embodiment of the invention.

FIG. 1 is a schematic cross-sectional view of an anti-glare and anti-reflection device according to an embodiment of the invention. Referring to FIG. 1, a display panel 10 has a display surface 10a facing a user. The display surface 10a is located in an area of the display panel 10 which is able to display a screen, i.e., an active area (AA) as called in the art most of the time. An anti-glare and anti-reflection device 100 is configured to be disposed on the display surface 10a, so as to diffuse an ambient light and to reduce an amount of the ambient light being reflected and thus enhance comfortability for a user when viewing the display panel 10. In terms of display media types, in the present embodiment, the display panel 10 may be a liquid crystal display (LCD); nevertheless, the invention is not limited thereto. In the rest of the embodiment, the display panel 10 may also be an organic light emitting diode (OLED), a micro-LED display, or other types of suitable displays. In terms of flexibility, in the present embodiment, the display panel 10 may be a rigid display; nevertheless, the invention is not limited thereto. In the rest of the embodiments, the display panel 10 may also be a flexible display.

Figure 2:
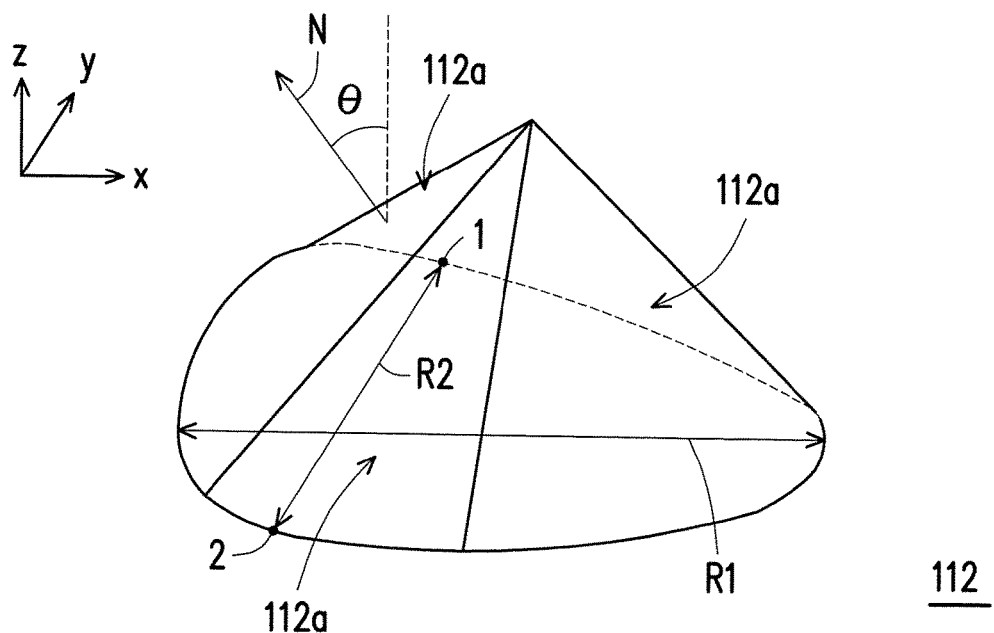
FIG. 2 is a schematic three-dimensional view of a micro protrusion of an anti-glare and anti-reflection device according to an embodiment of the invention.

FIG. 2 is a schematic three-dimensional view of a micro protrusion of an anti-glare and anti-reflection device according to an embodiment of the invention. In order to give a clear description, a Cartesian coordinate xyz is schematically illustrated in FIG. 1 and FIG. 2, and directions x, y, and z are perpendicular to each other. Referring to FIG. 1, the anti-glare and anti-reflection device 100 includes a base 110 disposed on the display surface 10a and an anti-reflection film 120 disposed on the base 110. Referring to FIG. 1 and FIG. 2, the base 110 includes a plurality of micro protrusions 112. The micro protrusions 112 are connected to each other to form a rough surface 114. The micro protrusions 112 (or the rough surface 114) include a plurality of sub-surfaces 112a. For instance, in the present embodiment, each of the sub-surfaces 112a may be viewed as a tangent plane passing through a point on each of the micro protrusions 112, and a surface of each of the micro protrusions 112 may be constituted by a plurality of tangent planes with different gradients. An angle θ is included between a normal direction N of each of the sub-surfaces 112a and a normal direction z of the display surface 10a. In the present embodiment, various angles θ are included between the normal directions N of the sub-surfaces 112a of the micro protrusions 112 and the normal direction z of the display surface 10a. More specifically, in the present embodiment, a plurality of shapes of the micro protrusions 112 may be different, and/or inclined levels of the sub-surfaces 112a of each of the micro protrusions 112 may also be different. The invention is not limited thereto. In addition, in the present embodiment, the base 110 may have a high haze. For instance, the haze of the base 110 may be greater than or equal to 70%, but the invention is not limited thereto.

Figure 3:
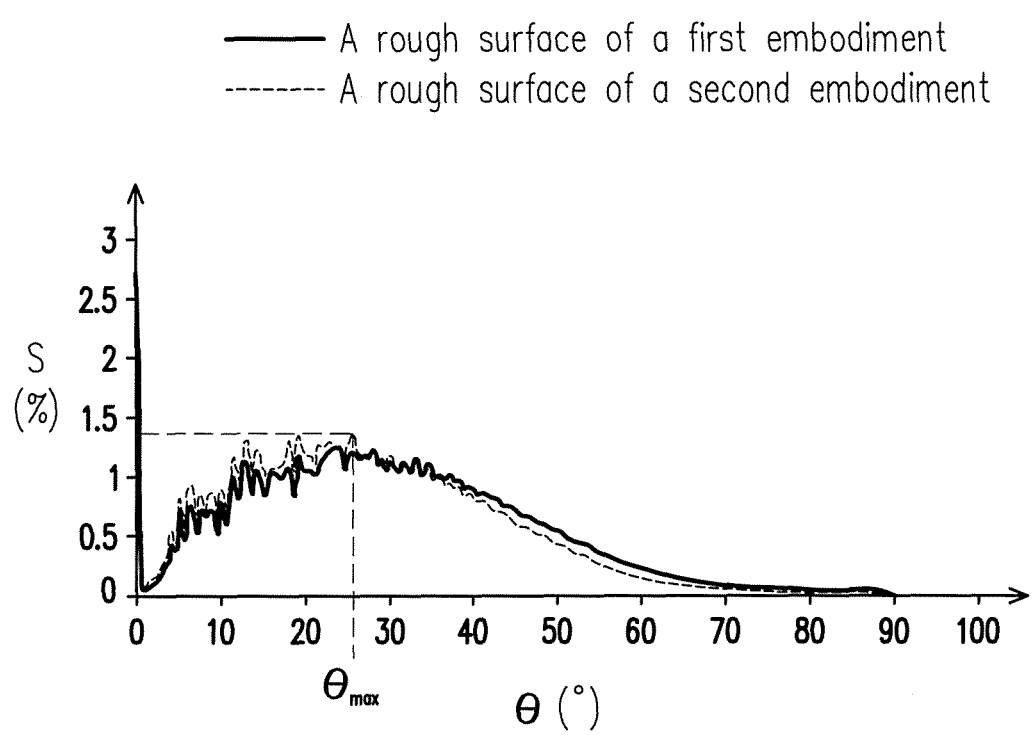
FIG. 3 illustrates relations between each of the angles θ and each of the ratios S % of the rough surfaces of a first embodiment and a second embodiment of the invention.

S % is a ratio of a sum of a plurality of normal projection areas of the sub-surfaces 112a with each of the angles θ to a normal projection area of the entire rough surface 114. The normal projection in the embodiments may be defined as follows: a transmission direction of a parallel light is perpendicular to the display surface 10a (i.e., the transmission direction of the parallel light is a −z direction), the parallel light is used to irradiate an entire element, and a projection of the element formed on the display surface 10a is the normal projection of the element. FIG. 3 illustrates relations between each of the angles θ and each of the ratios S % of the rough surfaces of a first embodiment and a second embodiment of the invention. Data of the first embodiment and the second embodiment shown in FIG. 3 is obtained by actual measuring of two sample products. Through data analysis, relations of the angles θ and the ratios S of the first embodiment and the second embodiment may be presented by the equation as follows:

$$S = A \cdot (\theta - B)^2 \cdot e^{\frac{-(\theta-C)^2}{D^2}}$$

Here, e refers to an index, $0.0009 \leq A \leq 0.001$, $-14 \leq B \leq -16.5$, $6.25 \leq C \leq 11.7$, and $16 \leq D \leq 31.5$.

Figure 4:
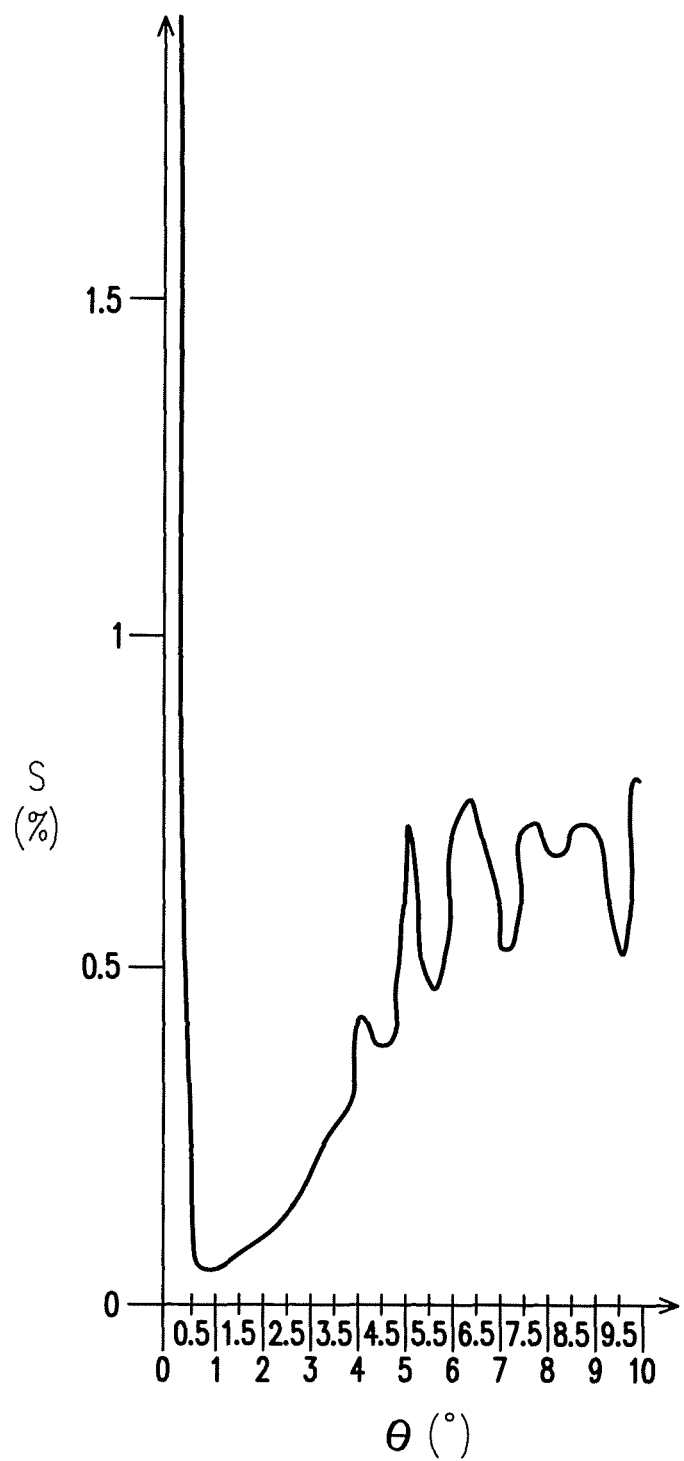
FIG. 4 is a schematic partially enlarged view representing a curve of the rough surface of the first embodiment of FIG. 3.

FIG. 4 is a schematic partially enlarged view representing a curve of the rough surface of the first embodiment of FIG. 3. Referring to FIG. 4, in the rough surface 114 of the first embodiment, the angle θ defined above is that, a sum of the normal projection areas of the sub-surfaces 112a with the angle θ is $b_\theta$. For instance, the sum of the normal projection areas of the sub-surfaces 112a with the angle θ of 1±0.5 degrees is $b_1°$, the sum of the normal projection areas of the sub-surfaces 112a with the angle θ of 2±0.5 degrees is $b_2°$, etc. In the rough surface 114 of the first embodiment, a sum of the normal projection areas of the sub-surfaces 112a with the angle θ ranging between 0 degree and 10 degrees is a1, and $$a1 = \sum_{\theta=0°}^{10°} b_\theta.$$

A ratio of the sum a1 of the normal projection areas of the sub-surfaces 112a with the angle θ ranging between 0 degree and 10 degrees to the normal projection area a of the entire rough surface 114 is a1/a, and $$\frac{a1}{a} = \sum_{\theta=0°}^{10°} \frac{b_\theta}{a}.$$

In the rough surface 114 of the first embodiment, a1/a is, for example, 11.249%. Generally, in the rough surface 114 of the first embodiment (and/or the second embodiment) of FIG. 3, the sum of the normal projection areas of the sub-surfaces 112a with the angle θ ranging between 0 degree and 10 degrees is a1, the normal projection area of the entire rough surface 114 is a, and $7.19\% \leq a1/a \leq 12.34\%$.

Similarly, the sum of the normal projection areas of the sub-surfaces 112a with the angle θ ranging between 10 degrees and 20 degrees is a2, the normal projection area of the entire rough surface 114 is a, and $10.75\% \leq a2/a \leq 19.56\%$; a sum of the normal projection areas of the sub-surfaces 112a with the angle θ ranging between 20 degrees and 30 degrees is a3, the normal projection area of the entire rough surface 114 is a, and $6.92\% \leq a3/a \leq 28.49\%$; a sum of the normal projection areas of the sub-surfaces 112a with the angle θ ranging between 30 degrees and 40 degrees is a4, the normal projection area of the entire rough surface 114 is a, and $1.88\% \leq a4/a \leq 30.35\%$; a sum of the normal projection areas of the sub-surfaces 112a with the angle θ ranging between 40 degrees and 50 degrees is a5, the normal projection area of the entire rough surface 114 is a, and $0.227\% \leq a5/a \leq 24.61\%$; a sum of the normal projection areas of the sub-surfaces 112a with the angle θ ranging between 50 degrees and 60 degrees is a6, the normal projection area of the entire rough surface 114 is a, and $0.0118\% \leq a6/a \leq 15.53\%$; a sum of the normal projection areas of the sub-surfaces 112a with the angle θ ranging between 60 degrees and 70 degrees is a7, the normal projection area of the entire rough surface 114 is a, and $0.0002\% \leq a7/a \leq 57.73\%$; a sum of the normal projection areas of the sub-surfaces 112a with the angle θ ranging between 70 degrees and 80 degrees is a8, the normal projection area of the entire rough surface 114 is a, and $0\% \leq a8/a \leq 3.06\%$; a sum of the normal projection areas of the sub-surfaces 112a with the angle θ ranging between 80 degrees and 90 degrees is a9, the normal projection area of the entire rough surface 114 is a, and $0\% \leq a9/a \leq 0.93\%$.

In the present embodiment, the sub-surfaces 112a of the rough surface 114 of the base 110 are inclined at different angles of θ, and $0° \leq \theta \leq 90°$. In particularly, most of the sub-surfaces 112a are inclined at larger angles. For instance, in the present embodiment, the rough surface 114 includes the sub-surfaces 112a. The angle θ is included between the normal direction N of each of the sub-surfaces 112a and the normal direction z of the display surface 10a. The sum of the normal projection areas of the sub-surfaces 112a with the angle θ is $b_θ$, and a normal projection area of the rough surface 114 is a. As shown in FIG. 3 (wherein the abnormal large value of S % corresponding to the angle θ ranging between 0° and 1° is caused by noise during measuring, and the abnormal large value of S % corresponding to the angle θ ranging between 0° and 1° can be ignored), $b_θ/a$ (i.e., S %) has a maximum value when the angle θ falls in a range greater than or equal to 0° and less than or equal to 90°, the corresponding angle θ of the maximum value is $θ_{max}$, and $15° ≤ θ_{max} ≤ 35°$. In other words, most of the angles θ included between the normal directions N of the sub-surfaces 112a and the normal direction z of the display surface 10a is within a range of 10° to 40°, and more preferably, most of the angles θ included between the normal directions N of the sub-surfaces 112a and the normal direction z of the display surface 10a is within a range of 15° to 35° (i.e., $15° ≤ θ_{max} ≤ 35°$). But the invention is not limited thereto. From another aspect, an average value of θ is $θ_{avg}$, $$θ_{avg} = \sum_{θ=0°}^{90°} θ \cdot b_θ/a,$$

and $5° ≤ θ_{avg} ≤ 35°$; more preferably, $15° ≤ θ_{avg} ≤ 35°$. But the invention is not limited thereto.

Referring to FIG. 1, the rough surface 114 of the base 110 has a first point 114a furthest from the display surface 10a (i.e., a highest point) and a second point 114b closest to the display surface 10a (i.e., a lowest point). A distance between the first point 114a and the second point 114b in the normal direction z of the display surface 10a is HD, and 1 μm ≤ HD ≤ 20 μm. Referring to FIG. 1 and FIG. 2, a normal projection of each of the micro protrusions 112 on the display surface 10a (e.g., an xy plane) has a first axis length R1 and a second axis length R2, 1 μm ≤ R1 ≤ 20 μm, and 1 μm ≤ R2 ≤ 20 μm. Here, the first axis length R1 may refer to a length of a first axis (i.e., the axis marked as R1) connected by two points furthest from each other at an edge of the normal projection of the micro protrusion 112. A second axis (i.e., the axis marked as R2) is perpendicular to the first axis (i.e., the axis marked as R1) and the normal direction z. The second axis (i.e., the axis marked as R2) and the edge of the normal projection of the micro protrusion 112 intersect at a first point 1 and a second point 2. The second axis length R2 may refer to a furthest distance that is between the first point 1 and the second point 2. In the present embodiment, the base 110 is a transparent material, for example, glass, optical acrylic, etc., but the invention is not limited thereto. In the rest of the embodiments, the base 110 may also be other suitable materials.

Referring to FIG. 1, the anti-reflection film 120 is disposed on the rough surface 114. The anti-reflection film 120 has a thickness T in the normal direction N of the rough surface 114. In the present embodiment, the thickness T of said anti-reflection film 120 may be defined as follows: the angle θ is included by the normal direction N of one of the sub-surfaces 112a and the normal direction z of the display surface 10a, $5° ≤ θ ≤ 10°$, and the thickness T refers to a thickness of part of the anti-reflection film 120 located on one of the sub-surfaces 12a with the angle θ ranging between 50 and 10° in the normal direction z of the display surface 10a. It is worth noting that T/HD ≤ 0.1. In other words, the thickness T of the anti-reflection film 120 is considerably less than a recess depth D of the rough surface 114, and the anti-reflection film 120 is conformally placed on the rough surface 114. As such, the anti-reflection film 120 disposed on the micro protrusions 112 of the base 110 is less likely to affect diffusion effect of the micro protrusions 112, and that the anti-glare and anti-reflection device 100 is equipped with favorable anti-glare as well as anti-reflection effects. In the present embodiment, the adjacent micro protrusions 112 are connected to each other, so as to define a recess 112b. The recess 112b has a lowest point P1 (i.e., a point closest to the display surface 10a), the micro protrusions 112 defining the recess 112b respectively have top points, and a lowest top point among the top points (i.e., the top point closest to the display surface 10a) is P2. The recess depth D is a distance between the top point P2 and the lowest point P1 of the recess 112b in the direction z.

Figure 5:
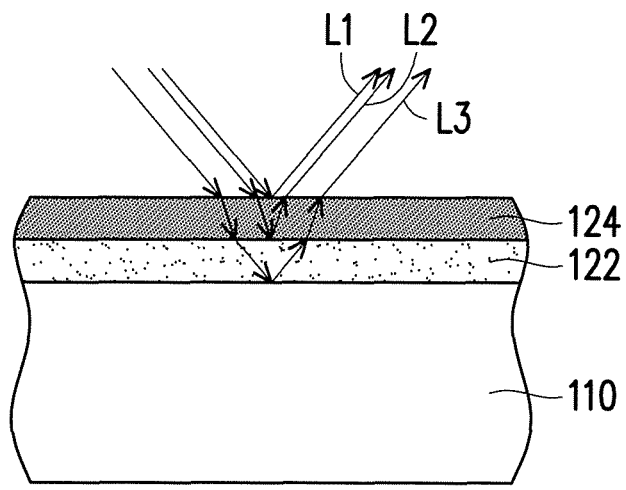
FIG. 5 is a schematic partially enlarged view of part of the base and part of the anti-reflection film of FIG. 1.

FIG. 5 is a schematic partially enlarged view of part of the base 110 and part of the anti-reflection film 120 of FIG. 1. Referring to FIG. 5, in the present embodiment, the anti-reflection film 120 includes at least one stacked dielectric layer with a reflectivity different from that of the base 110, for example, the anti-reflection film 120 includes two or more dielectric layers 122 and 124. A reflectivity of a material of the at least one dielectric layer 122 and/or 124 is different from that of a material of the base 110. The anti-reflection film 120 including two dielectric layers 122 and 124 is taken as example, and a first portion L1 of an ambient light incident to the anti-reflection film 120 is directly reflected by an upper surface of the dielectric layer 124 and exits the anti-reflection film 120. A second part L2 of the ambient light is subsequently refracted by the upper surface of the dielectric layer 124 to the dielectric layer 122, reflected by an interface between the dielectric layer 122 and the dielectric layer 124 to the upper surface of the dielectric layer 124, and refracted again by the upper surface of the dielectric layer 124 and exists the anti-reflection film 120. A third part L3 of the ambient light is subsequently refracted by the upper surface of the dielectric layer 124 to the dielectric layer 122, refracted by the interface between the dielectric layer 122 and the dielectric layer 124 to the base 110, reflected by an interface between the base 110 and the dielectric layer 122 to an upper surface of the dielectric layer 122, refracted again by the interface between the dielectric layer 122 and the dielectric layer 124 to the upper surface of the dielectric layer 124, and refracted again by the upper surface of the dielectric layer 124 and exists the anti-reflection film 120. Through adequate design of thicknesses and reflectivities of the dielectric layers 122 and 124, the first part L1, the second part L2, and the third part L3 of the ambient light which exist the anti-reflection film 120 may generate destructive interference. As such, an amount of the ambient light reflected by the anti-reflection film 120 is decreased, and that the anti-reflection film 120 is equipped with the anti-reflection effect. It is worth noting that FIG. 1 illustrates that one layer of the dielectric layer 124 is stacked on one layer of the dielectric layer 122, but the invention is not limited thereto. A number of the dielectric layers of the anti-reflection film 120 may be determined as required, and in the rest of the embodiments, the anti-reflection film 120 may also include multilayer dielectric layers 122 and dielectric layers 124 stacked on top of each other. In addition, in the present embodiment, a thickness of a single dielectric layer 122 or a single dielectric layer 124 of the anti-reflection film 120 may range between several nm and hundreds of nm. A total thickness of the anti-reflection film 120 may range between tens of nm and hundreds of nm, but the invention is not limited thereto.

Figure 6:
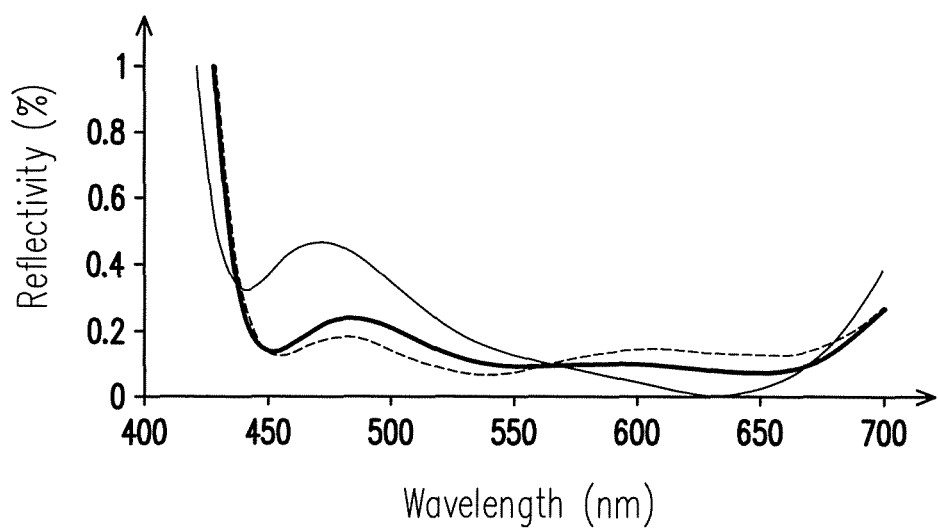
FIG. 6 illustrates the reflecting spectrums of the anti-reflection films of the first embodiment and the second embodiment and the reflecting spectrum of the anti-reflection film of the comparative example.

FIG. 6 illustrates the reflecting spectrums of the anti-reflection films of the first embodiment and the second embodiment and the reflecting spectrum of the anti-reflection film of the comparative example. The reflecting spectrums of FIG. 6 are all measured in the normal direction z of the display surface 10a. For instance, an anti-reflection film of a comparative example includes a first dielectric layer (e.g., $TiO_2$ with a thickness of 13.92 nm), a first second dielectric layer (e.g., $SiO_2$ with a thickness of 35.08 nm), a second first dielectric layer (e.g., $TiO_2$ with a thickness of 121.73 nm), and a second dielectric layer (e.g., $SiO_2$ with a thickness of 92.18 nm) sequentially stacked in the z direction. The anti-reflection film of the first embodiment includes a first dielectric layer (e.g., $TiO_2$ with a thickness of 13.65 nm), a first second dielectric layer (e.g., $SiO_2$ with a thickness of 35.75 nm), a second first dielectric layer (e.g., $TiO_2$ with a thickness of 120.66 nm), and a second dielectric layer (e.g., $SiO_2$ with a thickness of 92.7 nm) sequentially stacked in the z direction. The anti-reflection film of the second embodiment includes a first dielectric layer (e.g., $TiO_2$ with a thickness of 13.2 nm), a first second dielectric layer (e.g., $SiO_2$ with a thickness of 35.15 nm), a second first dielectric layer (e.g., $TiO_2$ with a thickness of 116.16 nm), and a second dielectric layer (e.g., $SiO_2$ with a thickness of 93.06 nm) sequentially stacked in the z direction. In short, total thicknesses of the anti-reflection films of the first embodiment and the anti-reflection films of the second embodiment are greater than a total thickness of the anti-reflection film of the comparative example, thicknesses of the first dielectric layers of the anti-reflection films of the first embodiment and the first dielectric layers of the anti-reflection films of the second embodiment are less than a total thickness of the first dielectric layers of the anti-reflection film of the comparative example, and total thicknesses of the second dielectric layers of the anti-reflection films of the first embodiment and the second dielectric layers of the anti-reflection films of the second embodiment are greater than the total thickness of the second dielectric layers of the anti-reflection film of the comparative example. Nevertheless, the invention is not limited thereto.

Referring to FIG. 6, reflectivities of the anti-reflection film of the comparative example in the normal direction z of the display surface 10a to blue light (e.g., a light with a wavelength ranging between 400 nm and 500 nm), green light (e.g., a light with a wavelength ranging between 500 nm and 600 nm), and red light (e.g., a light with a wavelength ranging between 600 nm and 700 nm) are approximately similar. In the first embodiment of the invention, a reflectivity of the anti-reflection film 120 in the normal direction z of the display surface 10a to blue light (especially a light with a wavelength ranging between 450 nm and 500 nm) is significantly greater than that to green light and that to red light. More specifically, in the first embodiment of the invention, the reflectivity of the anti-reflection film 120 in the normal direction z of the display surface 10a to green light (especially a light with a wavelength ranging between 500 nm and 600 nm) may be greater than or equal to that to red light (especially a light with a wavelength ranging between 600 nm and 650 nm). Similarly, in the second embodiment of the invention, the reflectivity of the anti-reflection film 120 in the normal direction z of the display surface 10a to blue light (especially a light with a wavelength ranging between 450 nm and 500 nm) is significantly greater than that to green light and that to red light. In the second embodiment of the invention, a reflectivity of the anti-reflection film 120 in the normal direction z of the display surface 10a to green light (especially a light with a wavelength ranging between 500 nm and 600 nm) may be greater than or equal to that to red light (especially a light with a wavelength ranging between 600 nm and 650 nm).

Figure 7:
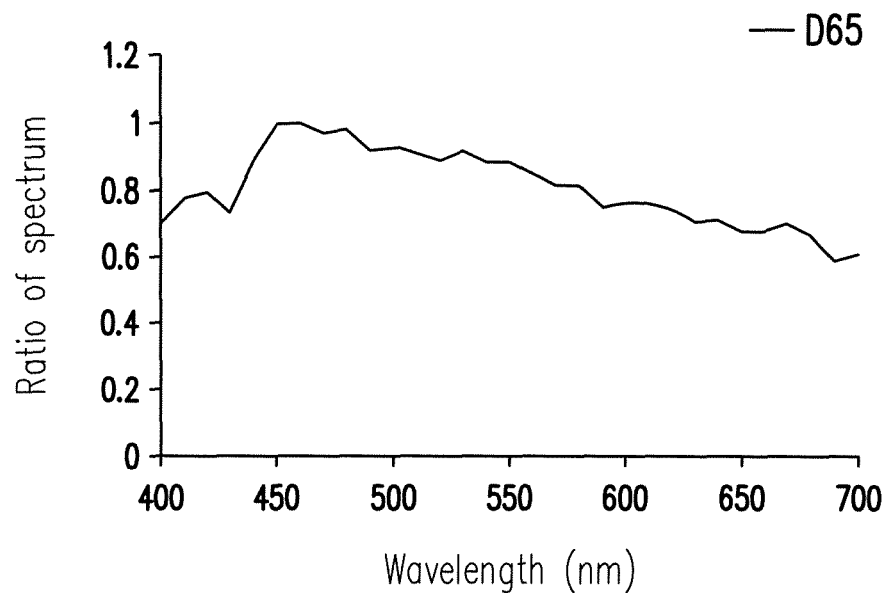
FIG. 7 illustrates a luminescent spectrum of a measurement light source (e.g., a D65 light source).
Figure 8:
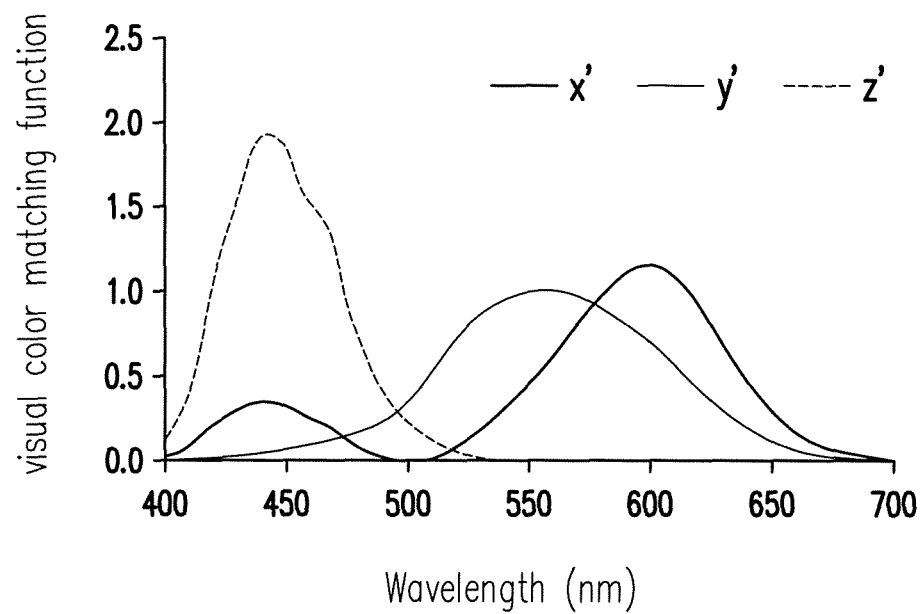
FIG. 8 illustrates visual factor color-matching functions x', y', and z'.

FIG. 7 illustrates a luminescent spectrum of a measurement light source (e.g., a D65 light source). FIG. 8 illustrates visual factor color-matching functions x', y', and z'. For instance, in the present embodiment, reflectivities $Y_R$, $Y_G$, and $Y_B$ of the anti-reflection film 120 in the normal direction z of the display surface 10a to red light, green light, and blue light may respectively be presented by following Equation (1), Equation (2), and Equation (3):

$$Y_R = \frac{\left( \int_{\lambda=600nm}^{\lambda=700nm} \begin{array}{l} \text{reflecting spectrum of anti-reflection film}(\lambda) \cdot \\ \text{luminescent spectrum of measurement light source}(\lambda) \cdot \\ \text{color-matching function } y'(\lambda) \cdot d\lambda \end{array} \right)}{\left( \int_{\lambda=400nm}^{\lambda=700nm} \begin{array}{l} \text{reflecting spectrum of anti-reflection film}(\lambda) \cdot \\ \text{luminescent spectrum of measurement light source}(\lambda) \cdot \\ \text{color-matching function } y'(\lambda) \cdot d\lambda \end{array} \right)} \times 100\%; \quad \text{Equation (1)}$$

$$Y_G = \frac{\left( \int_{\lambda=500nm}^{\lambda=600nm} \begin{array}{l} \text{reflecting spectrum of anti-reflection film}(\lambda) \cdot \\ \text{luminescent spectrum of measurement light source}(\lambda) \cdot \\ \text{color-matching function } y'(\lambda) \cdot d\lambda \end{array} \right)}{\left( \int_{\lambda=400nm}^{\lambda=700nm} \begin{array}{l} \text{reflecting spectrum of anti-reflection film}(\lambda) \cdot \\ \text{luminescent spectrum of measurement light source}(\lambda) \cdot \\ \text{color-matching function } y'(\lambda) \cdot d\lambda \end{array} \right)} \times 100\%; \quad \text{Equation (2)}$$

$$Y_R = \frac{\left( \int_{\lambda=400nm}^{\lambda=500nm} \begin{array}{l} \text{reflecting spectrum of anti-reflection film}(\lambda) \cdot \\ \text{luminescent spectrum of measurement light source}(\lambda) \cdot \\ \text{color-matching function } y'(\lambda) \cdot d\lambda \end{array} \right)}{\left( \int_{\lambda=400nm}^{\lambda=700nm} \begin{array}{l} \text{reflecting spectrum of anti-reflection film}(\lambda) \cdot \\ \text{luminescent spectrum of measurement light source}(\lambda) \cdot \\ \text{color-matching function } y'(\lambda) \cdot d\lambda \end{array} \right)} \times 100\%; \quad \text{Equation (3)}$$

wherein the measurement light source, for example, is but is not limited to the D65 light source.

In addition, since the anti-reflection film of the comparative example and the anti-reflection films of the first embodiment and the second embodiments are disposed on the same rough surface 114 (e.g., most of the angles θ of the sub-surfaces 112a of the rough surface 114 range between 20° and 30°), the reflectivity of the anti-reflection film of the comparative example is 0.21%, the reflectivity of the anti-reflection film of the first embodiment is 0.17%, and the reflectivity of the anti-reflection film of the second embodiment is 0.14% in terms of the wavelength range of visible lights and human eyes. In other words, compared to the anti-reflection film of the comparative example, 19% of reflection light is reduced for the anti-reflection film of the first embodiment, and 33.3% of reflection light is reduced for the anti-reflection film of the second embodiment. It thus can be seen that the anti-reflection films of the first and the second embodiments are able to provide favorable anti-reflection effect.

It should be noted that in an embodiment of the invention, if a reflecting spectrum of the anti-reflection film 120 is measured when an optical axis of a spectrometer is parallel to the normal direction z of the display surface 10a, the reflecting spectrum of the anti-reflection film 120 in the normal direction z measured by the spectrometer may be bluish. In other words, if an ambient light is incident to the sub-surfaces 112a substantially parallel to the display surface 10a in the −z direction, a reflecting spectrum of part of the anti-reflection film 120 located on the parallel sub-surfaces 112a in any direction may be bluish. The anti-reflection film 120 placed on the sub-surfaces 112a parallel to the display surface 10a is also placed on the inclined sub-surfaces 112a. Simultaneously, if an ambient light is incident to the inclined sub-surfaces 112a in the −z direction, as a reflection light of the ambient light formed in each of the dielectric layers 122 and 124 has a shorter transmission path difference in the anti-reflection film 120, such that, reflectivities of part of the anti-reflection film 120 placed on the inclined sub-surfaces 112a in any directions to blue light, to green light, and to red light may substantially be similar. In the present embodiment, most of an area of the anti-reflection film 120 is distributed on the inclined sub-surfaces 112a; thus, generally, the reflectivities of the anti-reflection film 120 in any directions to blue light, to green light, and to red light may substantially be similar, and that it is not easy for naked eyes to detect color shift in the anti-glare and anti-reflection device 100.

In view of the foregoing, the anti-glare and anti-reflection device provided by an embodiment of the invention includes the base and anti-reflection film. The base includes the micro protrusions, and the micro protrusions are connected to each other to form the rough surface. The anti-reflection film is conformally disposed on the rough surface. As such, the anti-reflection film disposed on the micro protrusions of the base is less likely to affect diffusion effect of the micro protrusions, and that the anti-glare and anti-reflection device is equipped with favorable anti-glare as well as anti-reflection effects.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An anti-glare and anti-reflection device disposed on a display surface of a display panel, the anti-glare and anti-reflection device comprising:
a base, comprising a plurality of micro protrusions, wherein the micro protrusions are connected to each other to form a rough surface, the rough surface has a first point furthest from the display surface and a second point closest to the display surface, a distance between the first point and the second point in a normal direction of the display surface is HD while $1\ \mu m \leq HD \leq 20\ \mu m$, and a normal projection of each of the micro protrusions on the display surface has a first axis length R1 and a second axis length R2 while $1\ \mu m \leq R1 \leq 20\ \mu m$ and $1\ \mu m \leq R2 \leq 20\ \mu m$; and an anti-reflection film, disposed on the rough surface, wherein the anti-reflection film has a thickness T in a normal direction of the rough surface, and $T/HD \leq 0.1$.

2. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of normal projection areas of the sub-surfaces with the angle θ is $b_\theta$, a normal projection area of the rough surface is a, $b_\theta/a$ has a maximum value when the angle θ falls in a range greater than or equal to 0° and less than or equal to 90°, and the corresponding angle θ of the maximum value is $\theta_{max}$ while $5° \leq \theta_{max} \leq 35°$.

3. The anti-glare and anti-reflection device as claimed in claim 2, wherein $15° \leq \theta_{max} \leq 35°$.

4. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of normal projection areas of the sub-surfaces with the angle θ ranging between 0 degree and 10 degrees is a1, a normal projection area of the rough surface is a, and $7.19\% \leq a1/a \leq 12.34\%$.

5. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of normal projection areas of the sub-surfaces with the angle θ ranging between 10 degrees and 20 degrees is a2, a normal projection area of the rough surface is a, and $10.75\% \leq a2/a \leq 19.56\%$.

6. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of normal projection areas of the sub-surfaces with the angle θ ranging between 20 degrees and 30 degrees is a3, a normal projection area of the rough surface is a, and $6.92\% \leq a3/a \leq 28.49\%$.

7. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of normal projection areas of the sub-surfaces with the angle θ ranging between 30 degrees and 40 degrees is a4, a normal projection area of the rough surface is a, and $1.88\% \leq a4/a \leq 30.35\%$.

8. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of normal projection areas of the sub-surfaces with the angle θ ranging between 40 degrees and 50 degrees is a5, a normal projection area of the rough surface is a, and $0.227\% \leq a5/a \leq 24.61\%$.

9. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of normal projection areas of the sub-surfaces with the angle θ ranging between 50 degrees and 60 degrees is a6, a normal projection area of the rough surface is a, and $0.0118\% \leq a6/a \leq 15.53\%$.

10. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of normal projection areas of the sub-surfaces with the angle θ ranging between 60 degrees and 70 degrees is a7, a normal projection area of the rough surface is a, and 0.0002%≤a7/a≤7.73%.

11. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of normal projection areas of the sub-surfaces with the angle θ ranging between 70 degrees and 80 degrees is a8, a normal projection area of the rough surface is a, and 0%≤a8/a≤3.06%.

12. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of normal projection areas of the sub-surfaces with the angle θ ranging between 80 degrees and 90 degrees is a9, a normal projection area of the rough surface is a, and 0%≤a9/a≤0.93%.

13. The anti-glare and anti-reflection device as claimed in claim 1, wherein the rough surface comprises a plurality of sub-surfaces, an angle θ is included between a normal direction of each of the sub-surfaces and the normal direction of the display surface, a ratio of a normal projection area of at least one of the sub-surfaces with the angle θ to a normal projection area of the rough surface is S %, and S satisfies the following equation:

$$S = A \cdot (\theta - B)^2 \cdot e^{\frac{-(\theta-C)^2}{D^2}},$$

wherein A is within a range of 0.0009 to 0.001, B is within a range of −14 to −16.5, C is within a range of 6.25 to 11.7, and D is within a range of 16 to 31.5.

14. The anti-glare and anti-reflection device as claimed in claim 1, wherein a reflectivity of the anti-reflection film in the normal direction of the display surface to blue light is greater than that to green light and that to red light.

15. The anti-glare and anti-reflection device as claimed in claim 14, wherein the reflectivity of the anti-reflection film in the normal direction of the display surface to green light is greater than or equal to that to red light.

16. The anti-glare and anti-reflection device as claimed in claim 1, wherein the rough surface comprises a plurality of sub-surfaces, an angle θ is included between a normal direction of each of the sub-surfaces and the normal direction of the display surface, a sum of a plurality of vertical projection areas of the sub-surfaces with the angle θ is $b_\theta$, a normal projection area of the rough surface is a; and when the angle θ falls in a range greater than or equal to 0° and less than or equal to 90°, an average value of θ is $\theta_{avg}$, $$\theta_{avg} = \sum_{\theta=0°}^{90°} \theta \cdot b_\theta / a,$$

and 5°≤$\theta_{avg}$≤35°.

17. The anti-glare and anti-reflection device as claimed in claim 16, wherein 15°≤$\theta_{avg}$≤35°.

* * * * *